(12) United States Patent
Zhang et al.

(10) Patent No.: US 11,764,928 B2
(45) Date of Patent: *Sep. 19, 2023

(54) REFERENCE SIGNAL CONFIGURATION METHOD, APPARATUS, AND SYSTEM

(71) Applicant: Huawei Technologies Co., Ltd., Shenzhen (CN)

(72) Inventors: Xi Zhang, Chengdu (CN); Rong Wen, Shenzhen (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,879

(22) Filed: May 26, 2022

(65) Prior Publication Data

US 2022/0393821 A1 Dec. 8, 2022

Related U.S. Application Data

(63) Continuation of application No. 16/808,341, filed on Mar. 3, 2020, now Pat. No. 11,362,781, which is a
(Continued)

(30) Foreign Application Priority Data

Jan. 6, 2017 (CN) .......................... 201710011404.4

(51) Int. Cl.
*H04L 5/00* (2006.01)
*H04L 1/00* (2006.01)
*H04W 72/04* (2023.01)

(52) U.S. Cl.
CPC .......... *H04L 5/0048* (2013.01); *H04L 1/0003* (2013.01); *H04L 5/0005* (2013.01);
(Continued)

(58) Field of Classification Search
None
See application file for complete search history.

(56) References Cited

U.S. PATENT DOCUMENTS

| | | |
|---|---|---|
| 2011/0164489 A1 | 7/2011 | Papasakellariou et al. |
| 2012/0155338 A1 | 6/2012 | Noh et al. |

(Continued)

FOREIGN PATENT DOCUMENTS

| | | |
|---|---|---|
| CN | 102835061 A | 12/2012 |
| CN | 104009832 A | 8/2014 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, total 406 pages, 3rd Generation Partnership Project, Valbonne, France (Sep. 2016).

(Continued)

*Primary Examiner* — Sulaiman Nooristany
(74) *Attorney, Agent, or Firm* — Leydig, Voit & Mayer, Ltd.

(57) ABSTRACT

The present disclosure provides a method and apparatus for reference signal configuration. The method includes: determining a time domain density of a phase tracking reference signal (PTRS) according to a first modulation and coding scheme (MCS) and correspondence information between MCSs and PTRS time domain densities; determining a frequency domain density of the PTRS according to a first scheduled bandwidth and correspondence information between scheduled bandwidths and PTRS frequency domain densities; and mapping the PTRS to one or more resource
(Continued)

elements (REs) according to the time domain density of the PTRS and the frequency domain density of the PTRS when certain conditions are met.

10 Claims, 14 Drawing Sheets

Related U.S. Application Data continuation of application No. 16/118,657, filed on Aug. 31, 2018, now Pat. No. 10,727,998, which is a continuation of application No. PCT/CN2017/107135, filed on Oct. 20, 2017.

(52) U.S. Cl.
CPC ........... *H04L 5/0098* (2013.01); *H04W 72/04* (2013.01); *H04L 5/0007* (2013.01); *H04L 5/0091* (2013.01)

(56) References Cited

U.S. PATENT DOCUMENTS

| | | |
|---|---|---|
| 2013/0266086 A1 | 10/2013 | Yang et al. |
| 2013/0272282 A1 | 10/2013 | Baik et al. |
| 2014/0010324 A1 | 1/2014 | Kenney et al. |
| 2014/0016622 A1 | 1/2014 | Bao et al. |
| 2014/0321406 A1 | 10/2014 | Marinier et al. |
| 2015/0195112 A1 | 7/2015 | Jones, IV et al. |
| 2018/0091350 A1 | 3/2018 | Akkarakaran et al. |
| 2018/0323933 A1* | 11/2018 | Nam ..................... H04W 72/12 |
| 2018/0359071 A1 | 12/2018 | Lee et al. |

FOREIGN PATENT DOCUMENTS

| | | |
|---|---|---|
| CN | 104221316 A | 12/2014 |
| CN | 104335542 A | 2/2015 |
| CN | 104396177 A | 3/2015 |
| CN | 104871467 A | 8/2015 |
| CN | 104871624 A | 8/2015 |
| CN | 105812112 A | 7/2016 |
| CN | 105827383 A | 8/2016 |
| JP | 2009184603 A | 8/2009 |
| JP | 4930424 B2 | 5/2012 |
| KR | 20120103692 A | 9/2012 |

OTHER PUBLICATIONS

LG Electronics, "DMRS Design Principle," 3GPP TSG RAN WG1 Meeting #87, Reno, USA, 3GPP Draft; R1-1611812, Nov. 13, 2016, XP051175781, total 6 pages, 3rd Generation Partnership Project, Valbonne, France (Nov. 14-18, 2016).
TS V5G.213 v1.4 (Oct. 2016), Cisco et al.,"Verizon 5G TF;Air Interface Working Group;Verizon 5th Generation Radio Access;Physical layer procedures(Release 1)", dated Oct. 2016, total 50 pages.
TS V5G.212 V1.5 (Sep. 2016), Cisco et al.,"Verizon 5G TF;Air Interface Working Group;Verizon 5th Generation Radio Access;Multiplexing and channel coding(Release 1)", dated Sep. 2016, total 62 pages.
TS V5G.211 V1.7 (Oct. 2016), Cisco et al.,"Verizon 5G TF;Air Interface Working Group;Verizon 5th Generation Radio Access;Physical channels and modulation(Release 1)", dated Oct. 2016, total 83 pages.
R1-1611382 CATT,"Discussion on phase tracking RS for NR",3GPP TSG RAN WG1 Meeting #87,Reno, USA, Nov. 14-18, 2016, total 3 pages.
R1-1611981 Intel Corporation,"On Phase Tracking for NR",3GPP TSG-RAN WG1 #87,Reno, USA, Nov. 14-18, 2016, total 8 pages.
R1-1611240 Huawei, HiSilicon,"Reference signal design for phase tracking",3GPP TSG RAN WG1 Meeting #87, Reno, USA, Nov. 14-18, 2016, total 5 pages.
R1-1612860 Nokia et al.,"On RS Design for Phase Tracking in NR",3GPP TSG-RAN WG1#87,Reno, U.S.A., Nov. 14-18, 2016, total 12 pages.
R1-1611246 Huawei, HiSilicon,"Functionalities and design of reference signal for demodulation of UL Channels", 3GPP TSG RAN WG1 Meeting #87, Reno, USA, Nov. 14-18, 2016, total 5 pages.
Huawei, HiSilicon et al.,"WF on RS for Phase Tracking", 3GPP TSG RAN WG1 Meeting #87 R1-1613553, Reno, USA, Nov. 14-18, 2016, total 3 pages.
LG Electronics,"Reference Signal for Frequency offset and Phase Tracking", 3GPP TSG RAN WG1 Meeting #87 R1-1611809, Reno, USA Nov. 14-18, 2016, total 7 pages.
U.S. Appl. No. 16/808.341, filed Mar. 3 2020.
U.S. Appl. No. 16/118,657, filed Aug. 31, 2018.

* cited by examiner

REFERENCE SIGNAL CONFIGURATION METHOD, APPARATUS, AND SYSTEM

CROSS-REFERENCE TO RELATED APPLICATIONS

This application is a continuation of U.S. patent application Ser. No. 16/808,341, filed on Mar. 3, 2020, which is a continuation of U.S. patent application Ser. No. 16/118,657, filed on Aug. 31, 2018, now U.S. Pat. No. 10,727,998, which is a continuation of International Patent Application No. PCT/CN2017/107135, filed on Oct. 20, 2017. The International Patent application claims priority to Chinese Patent Application No. 201710011404.4, filed on Jan. 6, 2017. All of the afore-mentioned patent applications are hereby incorporated by reference in their entireties.

TECHNICAL FIELD

Embodiments of the present invention relate to the field of communications technologies, and in particular, to a reference signal configuration method, an apparatus, and a system.

BACKGROUND 5G communications systems use higher carrier frequencies (referred to as higher frequencies) than Long Term Evolution (LTE) systems. Generally a 6 GHz frequency or above may be referred to as a high frequency. Frequency bands such as 28 GHz, 38 GHz, and 72 GHz are currently researched, to implement wireless communication with a larger bandwidth and a higher transmission rate. However, a high-frequency system has a more serious intermediate radio frequency distortion, especially stronger phase noise impact relative to conventional lower-frequency communication. In addition, the impact of a Doppler shift and a carrier frequency offset (CFO) may increase as a frequency increases.

Multiple-input multiple-output-orthogonal frequency division multiplexing (MIMO-OFDM) is used as an example. In consideration of phase noise and carrier frequency offsets at both a receive end and a transmit end, a receiving expression for an $n^{th}$ receive antenna on a $k^{th}$ subcarrier after fast Fourier transform (FFT) at the receive end is:

$$Y_n^k = \sum_{m=1}^{M} H_{nm}^k \underbrace{P_n^{r,0} P_m^{t,0} S_m^k}_{CPE} + \underbrace{\sum_{m=1}^{M} \sum_{i=0}^{K-1} P_n^{r,(k-i)K} H_{nm}^i \sum_{l=0, l \neq i \& l \neq k}^{K-1} P_m^{t,(i-l)} S_m^l}_{ICI} + Z_n^k.$$

where $$P_n^{r,k} = \frac{1}{K} \sum_{t=0}^{K-1} e^{j\theta_n^r(t)} e^{j2\pi tk/K},$$

$$P_m^{t,k} = \frac{1}{K} \sum_{t=0}^{K-1} e^{j\theta_m^t(t)} e^{j2\pi tk/K};$$

and in this case, $$P_n^{r,0} = \frac{1}{K} \sum_{t=0}^{K-1} e^{j\theta_n^r(t)},$$

$$P_m^{t,0} = \frac{1}{K} \sum_{t=0}^{K-1} e^{j\theta_m^t(t)}.$$

$H_{nm}^k$ indicates a channel from an $m^{th}$ transmit antenna to the $n^{th}$ receive antenna on the $k^{th}$ subcarrier, $S_m^k$ indicates sent data of the $m^{th}$ antenna on the $k^{th}$ subcarrier, $Z_n^k$ indicates noise on the $n^{th}$ receive antenna on the $k^{th}$ subcarrier, $P_n^{r,k}$ indicates a phase offset on the $n^{th}$ receive antenna on the $k^{th}$ subcarrier that is caused by the phase noise and the CFO at the receive end, and $P_m^{t,k}$ indicates a phase offset on an $m^{th}$ transmit antenna on the $k^{th}$ subcarrier that is caused by the phase noise and the CFO at the transmit end. The impact of phase noise on OFDM performance mainly lies in two aspects: a common phase error (CPE) and inter-carrier interference (ICI), and impact of the CFO on the OFDM performance mainly lies in the ICI. In an actual system, the ICI has weaker impact on performance than the CPE. Therefore, usually the CPE is preferably compensated for in a phase noise compensation solution.

Phase noise is used as an example. As a frequency band increases, a phase noise level decreases by 20*log(f1/f2). A 2 GHz frequency band and a 28 GHz frequency band are used as examples. A phase noise level of the 28 GHz frequency band is 23 dB higher than that of the 2 GHz frequency band. A higher phase noise level indicates stronger common phase error (CPE) impact and a larger phase error caused by a CPE, as shown in FIG. 1A to FIG. 1C.

Different subcarriers in a same OFDM symbol are under same impact of a CPE. Phase errors on different subcarriers are different because of impact of white Gaussian noise. Therefore, in frequency domain, a plurality of estimated phase noise values are obtained by using a specific quantity of phase noise reference signals, and the plurality of estimated phase noise values are averaged to obtain a CPE, to reduce the impact of the white Gaussian noise to a greatest extent. Theoretically, a larger quantity of phase noise reference signals indicates a better averaging effect and a more accurately estimated CPE. In time domain, because phase noise varies discontinuously, and there is no linear relationship between different symbols, performance is poorer if time domain pilots are sparser. In addition, a larger quantity of phase noise reference signals indicates more occupied time-frequency resources and higher overheads. Therefore, a compromise needs to be made between performance and overheads to determine the quantity of phase noise reference signals.

The prior art provides a phase tracking reference signal (the reference signal may also be referred to as a pilot) design solution, as shown in FIG. 2A-1, FIG. 2A-2, FIG. 2B-1, and FIG. 2B-2. A demodulation reference signal (DMRS) and a phase compensation reference signal (PCRS) (which may also be referred to as a phase tracking reference signal (PTRS), and the PCRS and the PTRS are not uniformly named in the industry currently and are collectively referred to as the PTRS subsequently for ease of description in the present invention) are used to complete channel estimation, phase noise estimation, and data demodulation together for both uplink and downlink. The DMRS is used for channel estimation and data demodulation, and the PTRS is used for tracking a residual phase error. There are a plurality of ports for the DMRS and the PTRS. A same antenna port is used for the PTRS and the DMRS in uplink, and a plurality of ports for the DMRS correspond to a same PTRS port in downlink. In time domain, PTRSs are consecutively mapped, to be specific, a PTRS is mapped to each symbol after the DMRS. In frequency domain, a frequency division manner is used between different ports. A time domain density and a frequency domain density are set to fixed values (an uplink density is 1/96, and a downlink density is 1/48). A quantity of reference signals increases as an effective bandwidth increases. When a data bandwidth is relatively small, there are a relatively small quantity of reference signals, and when the data bandwidth is less than four RBs, no PTRS is mapped, as shown in FIG. 2A-1 and FIG. 2A-2, and also FIG. 2B-1 and FIG. 2B-2.

In addition, 2-bit and 1-bit downlink control information (DCI) or uplink control information (UCI) are respectively used for downlink and uplink, to indicate PTRS-related configurations. The downlink is used as an example. The 2-bit DCI is used to indicate whether a base station is to send a PTRS and which port is used if the base station is to send the PTRS. Details are shown in Table 1.

TABLE 1

2-bit Configuration Information

| Bits | Configuration information |
|---|---|
| 00 | Send no PTRS |
| 01 | Send a PTRS by using a port 60 |
| 10 | Send a PTRS by using a port 61 |
| 11 | Send a PTRS by using a port 60 and a port 61 |

The prior art has the following disadvantages: PTRSs are consecutive in time domain, and a frequency division manner is used for a plurality of ports in frequency domain. Also, a time domain density and a frequency domain density are fixed values, and a relatively large quantity of subcarriers are occupied and overheads are relatively high when a data bandwidth is large. In addition, the prior art is not flexible because the fixed time domain density and the fixed frequency domain density are used for different scenarios such as different phase noise levels and different moving speeds.

SUMMARY

Embodiments of the present invention provide a reference signal configuration method. This can reduce resource overheads, is more flexible, and better fits requirements of different future 5G scenarios in comparison with the prior art.

According to a first aspect, a reference signal configuration method is provided, including: mapping a phase tracking reference signal (PTRS) to one or more orthogonal frequency division multiplexing (OFDM) symbols based on information about a correspondence between the PTRS and one or more of a modulation and coding scheme (MCS), a subcarrier spacing (SC), and a bandwidth (BW); and sending the one or more OFDM symbols to which the PTRS is mapped to a receive device.

In a possible design, the method further includes: determining to map the phase tracking reference signal (PTRS) to the one or more OFDM symbols.

In another possible design, the determining to map phase tracking reference signal (PTRS) to the one or more OFDM symbols specifically includes: when the MCS meets a preset condition, determining to map the PTRS to the one or more OFDM symbols.

In another possible design, the determining to map the PTRS to the one or more OFDM symbols specifically includes: when the bandwidth meets a preset condition and the MCS meets a preset condition, determining to map the PTRS to the one or more OFDM symbols.

In another possible design, the method further includes preconfiguring or prestoring information about a correspondence between the SC and/or the MCS and a PTRS time domain density, where the PTRS time domain density is used to indicate that one PTRS is mapped to every several OFDM symbols in time domain.

In another possible design, a correspondence between the SC and the PTRS time domain density is different SCs correspond to different PTRS time domain densities, or different SC intervals correspond to different PTRS time domain densities.

In another possible design, a correspondence between the MCS and the PTRS time domain density is different MCSs correspond to different PTRS time domain densities, or different MCS intervals correspond to different PTRS time domain densities.

In another possible design, the method further includes: preconfiguring or prestoring a correspondence between the bandwidth and a quantity of PTRS frequency domains.

In another possible design, the correspondence is: different bandwidth intervals correspond to different quantities of PTRS frequency domains.

In another possible design, the method further includes: preconfiguring or prestoring a correspondence between the bandwidth and a PTRS frequency domain density, where the PTRS frequency domain density is used to indicate that one PTRS is mapped to every several subcarriers in frequency domain.

In another possible design, the correspondence is: different bandwidth intervals correspond to different PTRS frequency domain densities.

In another possible design, the method further includes: preconfiguring or prestoring a correspondence between the MCS and a quantity of PTRS frequency domains.

In another possible design, the correspondence is: different MCS intervals correspond to different quantities of PTRS frequency domains.

In another possible design, the method further includes: preconfiguring or prestoring a correspondence between the MCS and a PTRS frequency domain density.

In another possible design, the correspondence is: different MCS intervals correspond to different quantities of PTRS frequency domains.

In another possible design, the method further includes: preconfiguring or prestoring a correspondence between both the MCS and the bandwidth and a quantity of PTRS frequency domains.

In another possible design, the method further includes: preconfiguring or prestoring a correspondence between both the MCS and the bandwidth and a PTRS frequency domain density.

In another possible design, the one or more OFDM symbols are some or all symbols of a physical downlink shared channel (PDSCH) or a physical uplink shared channel (PUSCH).

In another possible design, the receive device is a terminal or a base station.

According to a second aspect, a reference signal configuration method is provided, including: receiving one or more OFDM symbols from a transmit device; and determining a PTRS from the one or more OFDM symbols based on information about a correspondence between the PTRS and one or more of a MCS, a SC, and a BW. In a possible design, the determining a PTRS from the one or more OFDM symbols specifically includes obtaining a SC and/or a MCS of a current slot, determining a PTRS time domain density based on preconfigured information about a correspondence between the SC and/or the MCS and the PTRS time domain density; and determining a time-frequency location of the PTRS in the one or more OFDM symbols based on the PTRS time domain density and a preset rule. For purposes of clarity, preconfiguring information may relate to the prestoring of the actual information or preconfiguring how the information is to be obtained.

In another possible design, the determining a PTRS from the one or more OFDM symbols specifically includes: obtaining a bandwidth in a current network, and determining the time-frequency location of the PTRS in the one or more OFDM symbols based on preconfigured or prestored information about a correspondence between the bandwidth and a quantity of PTRS frequency domains.

In another possible design, the determining a PTRS from the one or more OFDM symbols specifically includes obtaining a bandwidth in a current network; and determining the time-frequency location of the PTRS in the one or more OFDM symbols based on preconfigured or prestored information about a correspondence between the bandwidth and a PTRS frequency domain density.

In another possible design, the determining a PTRS from the one or more OFDM symbols specifically includes obtaining the MCS of the current slot, obtaining a bandwidth in a current network, determining a quantity of PTRS frequency domains or a PTRS frequency domain density based on a preconfigured or prestored correspondence between both the MCS and the bandwidth and the quantity of PTRS frequency domains or the PTRS frequency domain density and determining the time-frequency location of the PTRS in the one or more OFDM symbols based on the quantity of PTRS frequency domains or the PTRS frequency domain density.

In another possible design, the transmit device is a base station or a terminal.

According to a third aspect, an embodiment of the present invention further provides a transmit device, including: a processor, configured to map a PTRS to one or more OFDM symbols based on information about a correspondence between the PTRS and one or more of a MCS, a SC, and a BW; and a transceiver, configured to send the one or more OFDM symbols to which the PTRS is mapped to a receive device.

In a possible design, the processor is further configured to determine to map the PTRS to the one or more OFDM symbols.

In a possible design, the processor is specifically configured to: when the MCS meets a preset condition, determine to map the PTRS to the one or more OFDM symbols.

In another possible design, the processor is specifically configured to: when the bandwidth meets a preset condition and the MCS meets a preset condition, determine to map the PTRS to the one or more OFDM symbols.

In another possible design, the transmit device further includes a memory, where the memory is configured to prestore information about a correspondence between the SC and/or the MCS and a PTRS time domain density, where the PTRS time domain density is used to indicate that one PTRS is mapped to every several OFDM symbols in time domain.

In another possible design, a correspondence between the SC and the PTRS time domain density is different SCs correspond to different PTRS time domain densities, or different SC intervals correspond to different PTRS time domain densities.

In another possible design, a correspondence between the MCS and the PTRS time domain density is different MCSs correspond to different PTRS time domain densities, or different MCS intervals correspond to different PTRS time domain densities.

In another possible design, the transmit device further includes the memory, and the memory is configured to prestore a correspondence between the bandwidth and a quantity of PTRS frequency domains.

In another possible design, the correspondence is: different bandwidth intervals correspond to different quantities of PTRS frequency domains.

In another possible design, the transmit device further includes the memory, and the memory is configured to prestore a correspondence between the bandwidth and a PTRS frequency domain density.

In another possible design, the correspondence is: different bandwidth intervals correspond to different PTRS frequency domain densities.

In another possible design, the transmit device further includes the memory, and the memory is configured to prestore a correspondence between the MCS and a quantity of PTRS frequency domains.

In another possible design, the transmit device further includes the memory, and the memory is configured to prestore a correspondence between the MCS and a PTRS frequency domain density.

In another possible design, the transmit device further includes the memory, and the memory is configured to prestore a correspondence between both the MCS and the bandwidth and a quantity of PTRS frequency domains.

In another possible design, the transmit device further includes the memory, and the memory is configured to prestore a correspondence between both the MCS and the bandwidth and a PTRS frequency domain density.

In another possible design, the transmit device is a base station or a terminal.

In another possible design, the receive device is a terminal or a base station.

According to a fourth aspect, an embodiment of the present invention further provides a receive device, including: a transceiver, configured to receive one or more OFDM symbols from a transmit device; and a processor, configured to determine a PTRS from the one or more OFDM symbols based on information about a correspondence between the PTRS and one or more of a MCS, a SC, and a BW.

In a possible design, the processor is specifically configured to obtain a SC and/or a MCS of a current slot and determine a PTRS time domain density based on preconfigured or prestored information about a correspondence between the SC and/or the MCS and the PTRS time domain density, where the PTRS time domain density is used to indicate that one PTRS is mapped to every several OFDM symbols in time domain and determine a time-frequency location of the PTRS in the one or more OFDM symbols based on the PTRS time domain density and a preset rule.

In another possible design, the processor is specifically configured to obtain a bandwidth in a current network and determine the time-frequency location of the PTRS in the one or more OFDM symbols based on preconfigured or prestored information about a correspondence between the bandwidth and a quantity of PTRS frequency domains.

In another possible design, the processor is specifically configured to obtain a bandwidth in a current network and determine the time-frequency location of the PTRS in the one or more OFDM symbols based on preconfigured or prestored information about a correspondence between the bandwidth and a PTRS frequency domain density.

In another possible design, the processor is specifically configured to obtain the MCS of the current slot obtain a bandwidth in a current network, determine a quantity of PTRS frequency domains or a PTRS frequency domain density based on a preconfigured or prestored correspondence between both the MCS and the bandwidth and the quantity of PTRS frequency domains or the PTRS frequency domain density, and determine the time-frequency location of the PTRS in the one or more OFDM symbols based on the quantity of PTRS frequency domains or the PTRS frequency domain density.

In another possible design, the transmit device is a base station or a terminal.

In another possible design, the receive device is a terminal or a base station.

According to a fifth aspect, an embodiment of the present invention further provides a communications system, including the transmit device according to the third aspect and/or the receive device according to the fourth aspect.

In the embodiments of the present invention, a correspondence between the PTRS and the subcarrier spacing or the modulation and coding scheme or the bandwidth is used to implicitly indicate the time-frequency location of the PTRS. In comparison with the prior art, no explicit indication is required, and signaling overheads are reduced.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2B-1 and FIG. 2B-2 are a schematic diagram of a downlink phase tracking pilot solution in the prior art;

DESCRIPTION OF EMBODIMENTS

Figure 1A:
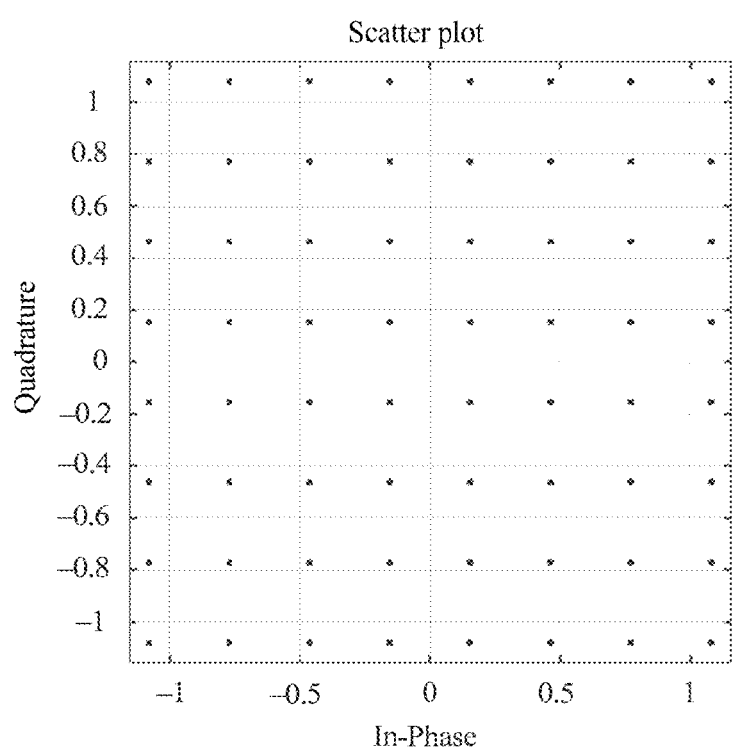
FIG. 1A shows constellation points at which 64QAM (quadrature amplitude modulation) modulation signal is not affected by phase noise.
Figure 1B:
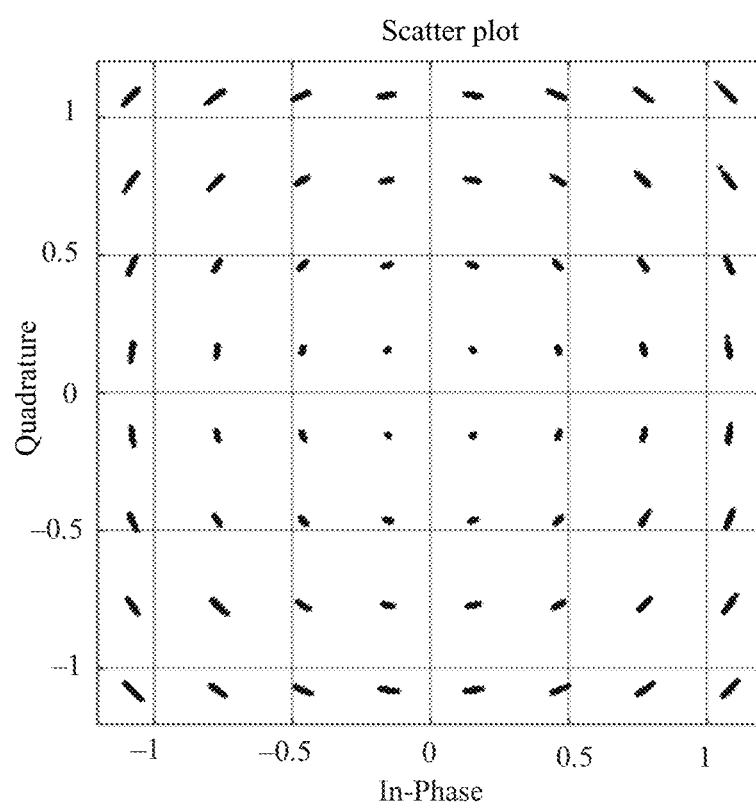
FIG. 1B shows constellation points at which 64QAM modulation signal is affected by phase noise on a 2 GHz frequency band.
Figure 1C:
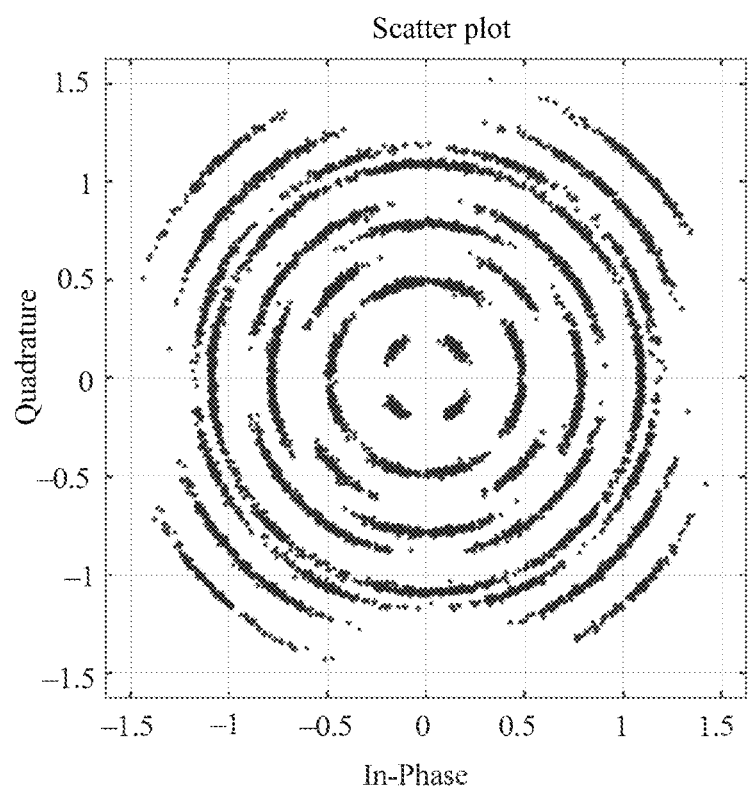
FIG. 1C shows constellation points at which 64QAM modulation signal is affected by phase noise on a 28 GHz frequency band.
Figures 1, 2A:
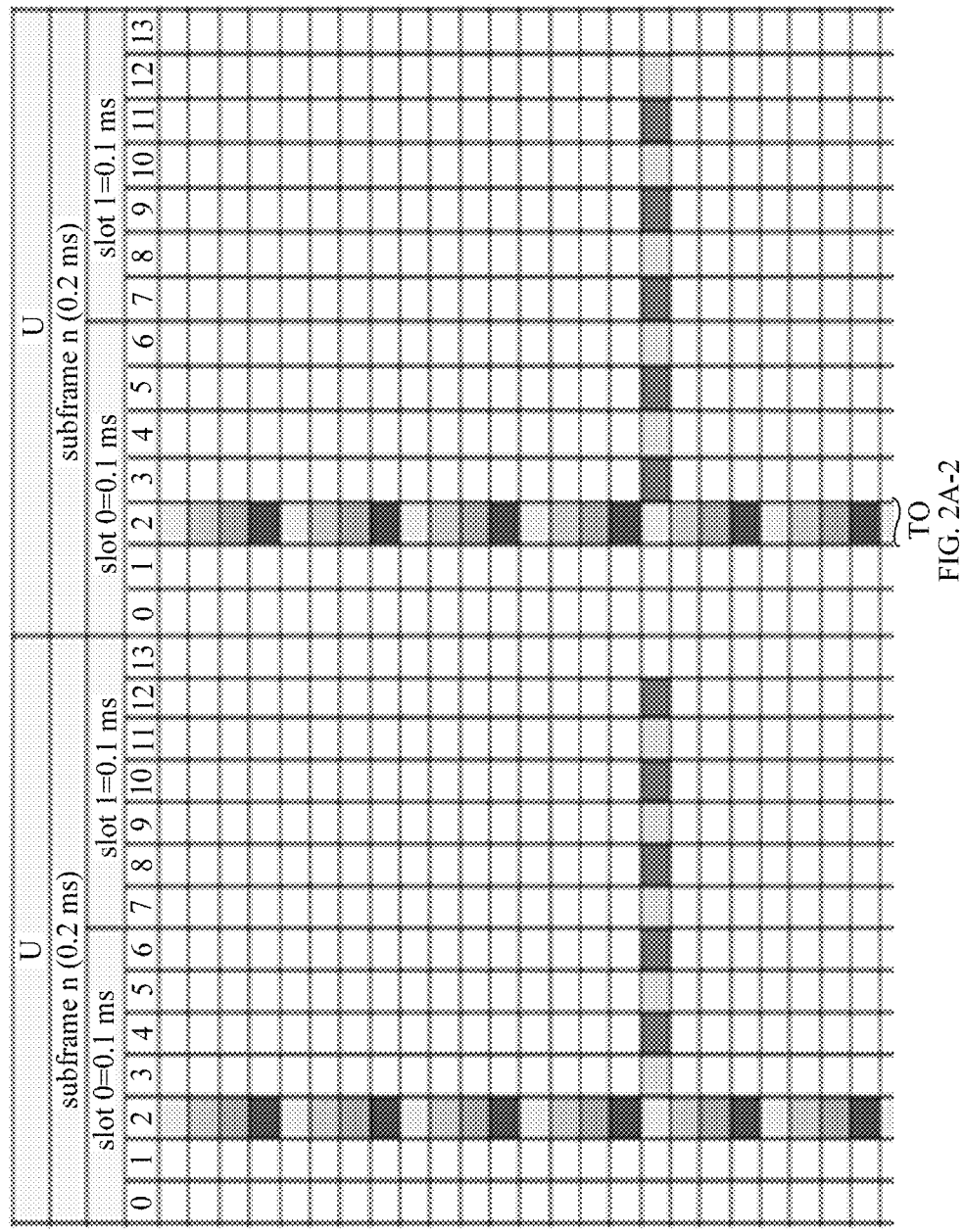
FIG. 2A-1 and FIG. 2A-2 are a schematic diagram of an uplink phase tracking pilot solution in the prior art.
Figures 2, 2A:
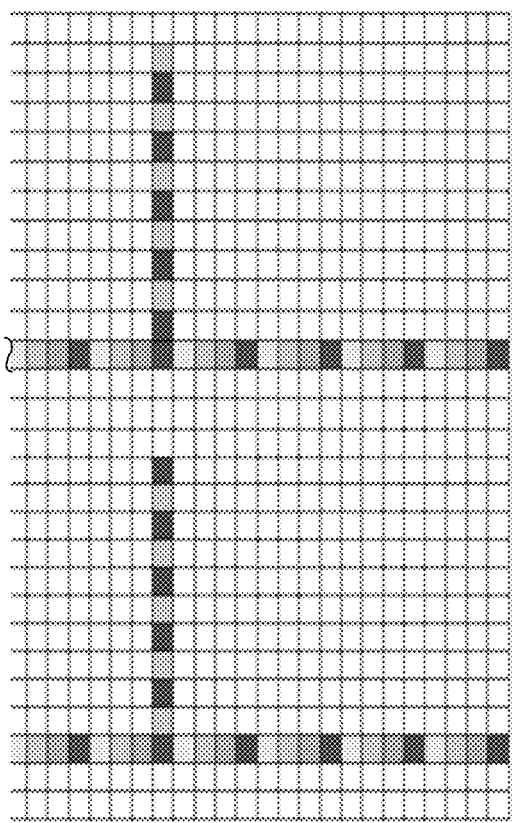
Figures 2, 2B:
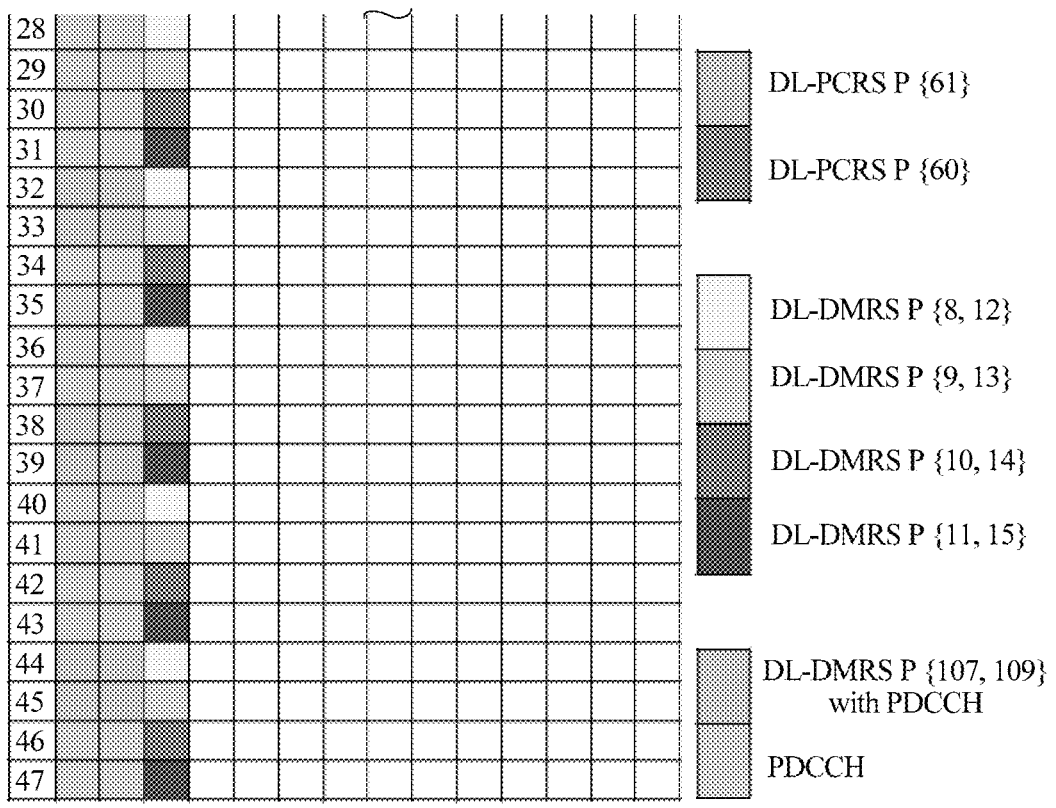
Figure 3:
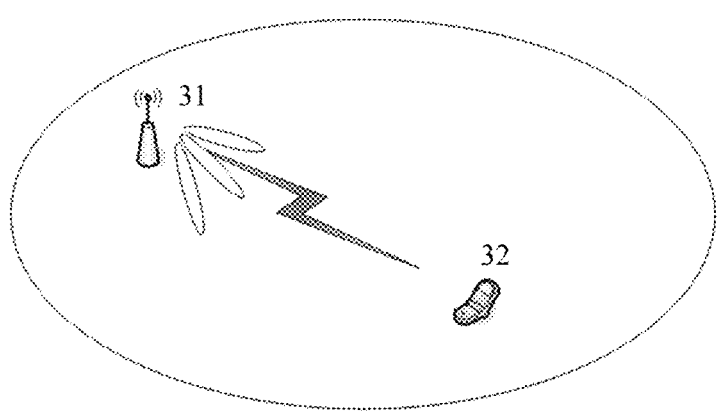
FIG. 3 is a schematic diagram of a network architecture according to an embodiment of the present disclosure.

FIG. 3 is a schematic architectural diagram of an application scenario according to an embodiment of the present disclosure. A network architecture shown in FIG. 3 mainly includes a base station 31 and a terminal 32. The base station 31 may communicate with the terminal 32 by using a millimeter-wave band of a low frequency (mainly 6 GHz or below) or a relatively high frequency (6 GHz or above). For example, the millimeter-wave band may be 28 GHz, 38 GHz, or an enhanced bandwidth (E-band) band of a data plane with a relatively small coverage area, for example, a frequency band of 70 GHz or above. The terminal 32 in coverage of the base station 31 may communicate with the base station 31 by using the millimeter-wave band of a low frequency or a relatively high frequency.

The terminal 32 in the present invention may communicate with one or more core networks by using a radio access network (RAN). The terminal 32 may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, or the like.

The base station 31 in the present invention may be a Wireless Fidelity (Wi-Fi) station, an eNodeB in LTE, or a base station in next generation communication, for example, a 5G base station gNB, a small cell, a micro base station, or may be a relay node, an access point, an in-vehicle device, a wearable device, or the like operating on a high frequency band.

Figure 4:
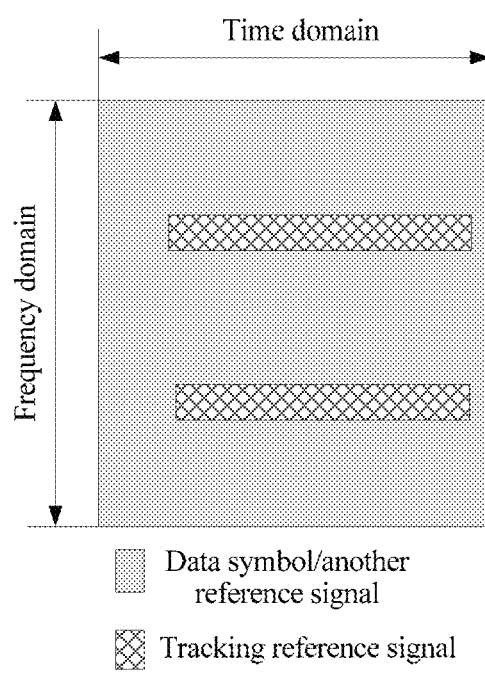
FIG. 4 is a schematic diagram of a reference signal design pattern according to an embodiment of the present disclosure.

Reference signals designed in the embodiments of the present invention are shown in FIG. 4 (a horizontal axis indicates time domain, and a vertical axis indicates frequency domain). In one transmission slot, a PTRS is mapped to one or more OFDM symbols at a specific time domain density and a specific frequency domain density. The PTRS is usually used to track a rapid channel change, for example, track changes of a carrier frequency offset (CFO), phase noise (PN), and a Doppler shift. The PTRS usually occupies several subcarriers in frequency domain, and in time domain, may occupy all OFDM symbols to which the PTRS is to be mapped, or occupy some OFDM symbols at a specific interval, or occupy some OFDM symbols according to another rule. The rule may be specified in a standard and preconfigured or prestored on a transmit device and a receive device.

Optionally, the OFDM symbols to which the PTRS is to be mapped are all symbols on a physical downlink shared channel (PDSCH) or a physical uplink shared channel (PUSCH), or all OFDM symbols except an OFDM symbol to which a DMRS is to be mapped, or may be OFDM symbols occupied by another control channel. This is not limited in the present invention.

Figure 5:
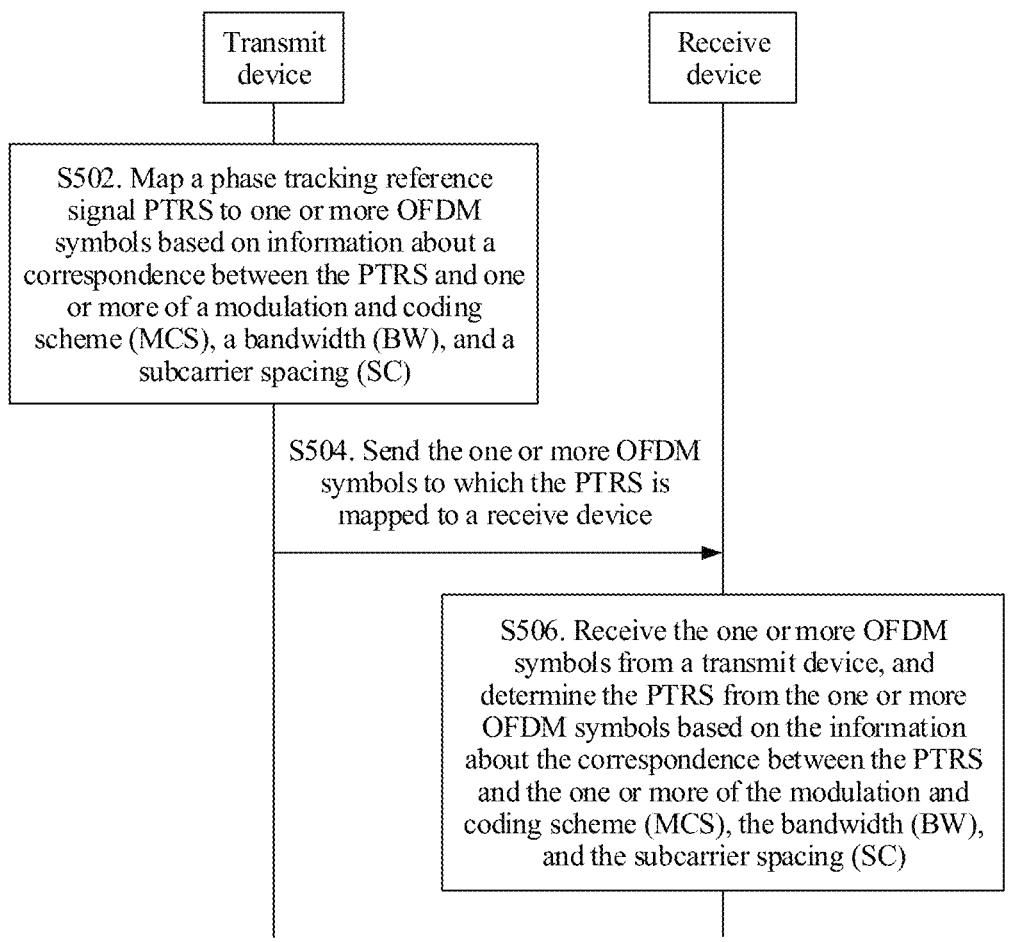
FIG. 5 is a schematic diagram of a reference signal configuration method according to an embodiment of the present disclosure.

As shown in FIG. 5, an embodiment of the present invention provides a reference signal configuration method. The method includes the following steps.

S502. A transmit device maps a PTRS to one or more OFDM symbols based on information about a correspondence between the PTRS and one or more parameters. The parameters include, but are not limited to, a modulation and coding scheme (MCS), a bandwidth (BW), and a subcarrier spacing (SC).

S504. The transmit device sends the one or more OFDM symbols to which the PTRS is mapped to a receive device.

S506. The receive device receives the one or more OFDM symbols from the transmit device, and determines the PTRS from the one or more OFDM symbols based on the information about the correspondence between the PTRS and the one or more of the MCS, the BW, and the SC.

It should be understood that the transmit device mentioned in this embodiment of the present invention may be a base station or a terminal. When the transmit device is a base station, the receive device is a terminal; or when the transmit device is a terminal, the receive device is a base station.

Optionally, before step S502, the method further includes:

S501: Determine whether to map the phase tracking reference signal (PTRS).

Step S501 of determining whether to map the phase tracking reference signal (PTRS) specifically includes the following implementations.

In a possible implementation, when the modulation and coding scheme (MCS) meets a preset condition, it is determined to map the phase tracking reference signal (PTRS).

For example, when the MCS is less than a threshold M0, the transmit device maps no PTRS; or when the MCS is greater than a threshold M0, the transmit device maps the phase tracking reference signal to one or more OFDM symbols. M0 indicates a threshold for determining whether to map the PTRS, M0 is an integer greater than 0, and a larger MCS indicates a higher modulation and coding rate.

For example, a value of the modulation and coding scheme (MCS) is referred to as an MCS index. In LTE, the MCS is used to indicate a modulation order and a bit rate, and one MCS index corresponds to one modulation order and one bit rate. A 3GPP R14 protocol is used as an example. One MCS index corresponds to one modulation order and one transport block size (TBS), and a TBS index is a parameter corresponding to the bit rate, as shown in Table 2.

TABLE 2

3GPP 36.213: Modulation, TBS index and redundancy version table for PUSCH

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Therefore, comparison between the MCS and M0 mentioned in this embodiment of the present invention is actually comparison between $I_{MCS}$ and M0 in Table 2, and M0 is an integer greater than 0.

It should be further understood that currently a specific value of $I_{MCS}$ is not determined in a standard, an $I_{MCS}$ value in the future may be different from that in existing LTE (for example, in Table 2). No limitation is imposed on the $I_{MCS}$ value in this embodiment of the present invention.

In another possible implementation, it may be determined, based on both the MCS and the bandwidth (BW), whether the phase tracking reference signal needs to be mapped. For example, when $I_{MCS}$ is less than M0, or when $I_{MCS}$ is less than M1 and the BW is less than a preset threshold B0, the transmit device maps no phase tracking information; otherwise, the transmit device needs to map phase tracking information to one or more OFDM symbols. M0 indicates a first threshold for determining whether to map the PTRS, M1 indicates a second threshold for determining whether to map the PTRS, and B0 indicates a BW threshold for determining whether to map the PTRS.

It should be understood that the thresholds M0, B0, and M1 mentioned above may be constants as specified in a standard, or may be dynamically adjusted. If the thresholds need to be dynamically adjusted, a base station side may actively initiate a threshold adjustment, or a terminal side may actively initiate an adjustment request.

For example, the base station may use higher layer signaling to instruct to adjust the MCS threshold M0, or instruct to adjust the MCS threshold M1 and the BW threshold B0, to adapt to different scenarios and conditions. For example, the MCS threshold M0, or the MCS threshold M1 and the BW threshold B0 are adjusted by using signaling in the following two manners:

In Manner 1, a new MCS threshold M0, or a new MCS threshold M1 and a new BW threshold B0 are directly configured by using higher layer signaling such as a radio resource control (RRC) or Media Access Control (MAC) control element (MAC CE).

In Manner 2, a subset that includes a plurality of MCS thresholds is stored at a higher layer. Different MCS subsets represent different configuration solutions. A command for adjusting an MCS threshold upward or downward by L levels is configured by using higher layer signaling. The MCS threshold is correspondingly increased or decreased by L levels based on the command at a physical layer. L is an integer greater than or equal to 1. It should be understood that in this manner, the higher layer signaling may include a plurality of bits, one bit is used to indicate whether to increase or decrease the MCS threshold, and the other bits are used to indicate a specific level.

It should be noted that when the preset condition mentioned in the foregoing embodiment is not met, a PTRS-related operation is terminated; or when the preset condition mentioned in the foregoing embodiment is met, a PTRS time domain density and a PTRS frequency domain density need to be determined based on information provided in the following embodiment.

For step S502 of mapping a PTRS to one or more OFDM symbols based on information about a correspondence between the PTRS and one or more of a MCS, a BW, and a SC, it should be understood that before step S502, the transmit device needs to preconfigure or prestore the information about the correspondence between the PTRS and the one or more of the MCS, the bandwidth (BW), and the SC.

Specifically, the information about the correspondence between the PTRS and the one or more of the MCS, the BW, and the SC may be directly specified in the standard and stored by the transmit device in a memory. Alternatively, before the PTRS is mapped, the transmit device preconfigures the information about the correspondence between the PTRS and the one or more of the MCS, the BW, and the SC.

Specifically, the information about the correspondence between the PTRS and the one or more of the MCS, the BW, and the SC includes two dimensions: time domain and frequency domain. The following separately provides descriptions from the two dimensions: time domain and frequency domain.

Time Domain Solution

In time domain, the PTRS may occupy all OFDM symbols to which the PTRS is to be mapped, or occupy, at a specific interval, some OFDM symbols to which the PTRS may be mapped, or occupy some OFDM symbols according to a preset rule.

Figure 6A:
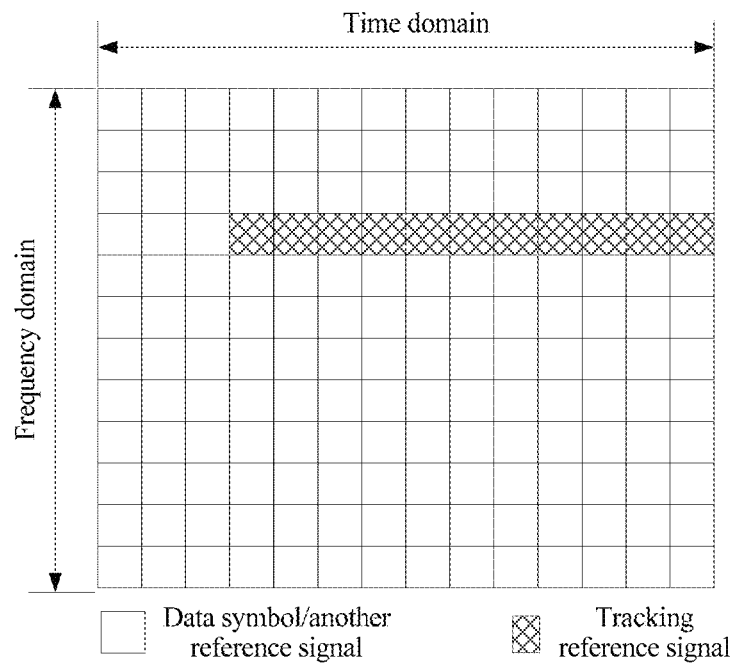
FIG. 6A is a schematic diagram of a PTRS time domain mapping according to an embodiment of the present disclosure.
Figure 6B:
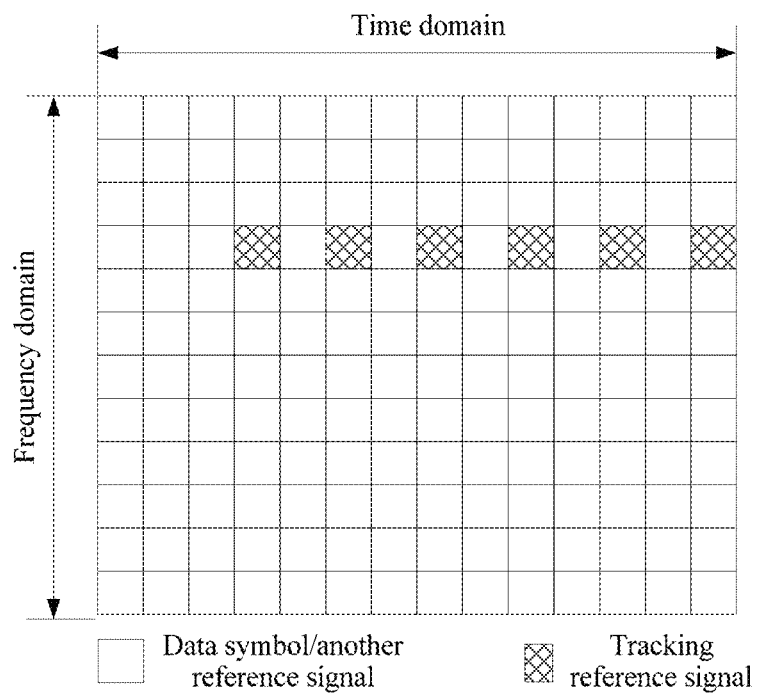
FIG. 6B is a schematic diagram of another PTRS time domain mapping according to an embodiment of the present disclosure.

One resource block (RB, including 12 resource elements (RE)) is used as an example. It is assumed that one transmission slot is 14 OFDM symbols (numbered from 0 to 13), and OFDM symbols to which the PTRS may be mapped are numbered from 3 to 13. For example, two specific embodiments are provided in FIG. 6A and FIG. 6B, and respectively correspond to an example in which the PTRS is mapped to all the OFDM symbols to which the PTRS may be mapped in time domain and an example in which the PTRS occupies only about half the OFDM symbols.

The base station preconfigures or prestores a table of a correspondence between a time domain density and the SC or the MCS, and then obtains PTRS time domain density configuration information of a current slot based on the table and SC information and MCS information of the current slot. The time domain density is used to indicate that one PTRS is mapped to every several OFDM symbols. For example, if the time domain density is ⅓, it indicates that one PTRS is mapped to every three OFDM symbols, or if the time domain density is ¼, it indicates that one PTRS is mapped to every four OFDM symbols.

In this embodiment of the present invention, the receive device may determine the PTRS time domain density based on the SC and/or the MCS, and then obtain the PTRS. In comparison with the prior art, no additional indication information is required to notify a receive end.

There are a plurality of mapping rules between the PTRS time domain density and the SC and/or the MCS. The following provides descriptions by using a plurality of embodiments.

Embodiment 1: Establish a one-to-one correspondence between subcarrier spacings (SCs) and time domain densities.

Specifically, a larger subcarrier spacing indicates a smaller PTRS time domain density, and this is represented by Density=$1/\lfloor SC/SC_0/\alpha_0 \rfloor$ or Density=$1/\lceil SC/SC_0/\alpha_0 \rceil$. Density indicates the time domain density. For example, if a value of Density is ⅓, it indicates that one PTRS is mapped to every three OFDM symbols. SC indicates a current subcarrier spacing, $SC_0$ is a reference subcarrier spacing, $\alpha_0$ is a constant, and $\lfloor \ \rfloor$ and $\lceil \ \rceil$ respectively indicate rounding down and rounding up.

For example, $SC_0$=60 k, and $\alpha_0$=1. When SC=60 k, the PTRS time domain density is 1, when SC=120 k, the PTRS time domain density is ½, when SC=240 k, the PTRS time domain density is ¼, and so on, as shown in Table 3.

TABLE 3

| Subcarrier spacing | Time domain density |
|---|---|
| 60k | 1 |
| 120k | ½ |
| 240k | ¼ |
| 480k | ⅛ |

It should be understood that the time domain density is greater than or equal to 1/total quantity of symbols and less than or equal to 1. When the time domain density (Density) is greater than 1, Density is directly set to 1, to be specific, the PTRS is mapped to all symbols. When Density is less than 1/total quantity of symbols, Density is directly set to 1/total quantity of symbols, to be specific, the PTRS is mapped to only one of the symbols. Herein the total quantity of symbols is a total quantity of symbols to which the PTRS may be mapped in one slot. Details are not described repeatedly below.

Further, when the time domain density is less than 1, for example, the time domain density is ⅕, and there are a total of 10 OFDM symbols, the PTRS needs to be mapped to two OFDM symbols, and the PTRS may be mapped to two of the symbols according to a preset rule. For example, the preset rule may be mapping the PTRS to first two symbols, or mapping the PTRS to a symbol 4 and a symbol 9, or mapping the PTRS based on an algorithm or a formula.

The preset rule may be prestored on the transmit device and the receive device. When obtaining the time domain density, the receive device may determine a specific time-frequency location of the PTRS according to the prestored rule.

Optionally, after a table of a correspondence between the subcarrier spacing and the time domain density is established, the time domain density may also be corrected based on the modulation and coding scheme (MCS). Specifically, the time domain density may be adjusted by correcting a value of $\alpha_0$. For example, MCSs may be classified into x levels, and x is greater than or equal to 1. Each MCS level corresponds to one value of $\alpha$, as shown in Table 4. In this case, a system may obtain a PTRS time domain density of the current slot based on the preset table of the correspondence between the SC and the time domain density with reference to the MCS level, as shown in Table 4.

TABLE 4

| MCS level | 0 | 1 | ... | X |
|---|---|---|---|---|
| MCS interval | [MCS$_0$, MCS$_1$) | [MCS$_1$, MCS$_2$) | ... | [MCS$_{x-1}$, MCS$_x$) |
| Adjustment factor | $\alpha_0$ | $\alpha_1$ | ... | $\alpha_x$ |

It should be understood that MCS interval classification in Table 4 is merely an example, and intervals may be (MCS$_0$, MCS$_1$], (MCS$_1$, MCS$_2$], (MCS$_2$, MCS$_3$], and the like. This is not limited in the present invention.

A value of the MCS is a positive integer.

In this way, a corrected time domain density is Density=1/$\lceil SC/SC_0/\alpha_0 \rceil$, and the value of $\alpha_0$ is no longer a constant, but corresponds to different $\alpha_0$, $\alpha_1$, and $\alpha_x$ based on different MCS intervals recorded in Table 4. In this case, a final time domain density is related to both the SC and the MCS.

In the configuration of Embodiment 1, after receiving the one or more OFDM symbols from the transmit device, the receive device may determine a time-frequency location of the PTRS in the one or more OFDM symbols in the following manner:

obtaining a subcarrier spacing (SC) and/or a modulation and coding scheme (MCS) of a current slot;

determining the PTRS time domain density based on preconfigured or prestored information about a correspondence between the subcarrier spacing (SC) and/or the modulation and coding scheme (MCS) and the PTRS time domain density, where the PTRS time domain density is used to indicate that one PTRS is mapped to every several OFDM symbols in time domain; and determining the time-frequency location of the PTRS in the one or more OFDM symbols based on the PTRS time domain density and a preset rule.

Embodiment 2: Establish a one-to-one correspondence between time domain densities and SCs.

Specifically, SCs may be classified into K levels, each level corresponds to one SC interval, and a subcarrier spacing interval corresponding to a level k is [SC$_{k-1}$, SC$_k$]. In addition, one SC level corresponds to one time domain density. Table 5 provides a specific example for SC levels and time domain densities.

TABLE 5

| SC level | 1 | 2 | 3 | ... |
|---|---|---|---|---|
| SC interval | <60k | [60k, 120k) | [120k, 240k) | ... |
| Time domain density | 1 | ½ | ¼ | ... |

Optionally, after a table of a correspondence between the SC and the time domain density is established, the preset table may be corrected based on the MCS.

Specifically, the time domain density may be adjusted by correcting the SC level. For example, MCSs may be classified into 2*x levels, and each MCS level corresponds to one SC level correction amount, as shown in Table 6. For example, when a value of the MCS level is 0, the table of the correspondence between the SC and the time domain density is not corrected; or when a value of the MCS level is x, the SC level increases by x levels; or when a value of the MCS level is -x, the SC level decreases by x levels. A larger MCS indicates a larger time domain density. In this case, a system may obtain a PTRS time domain density of the current slot based on the preset table of the correspondence between the SC and the time domain density with reference to the MCS level, as shown in Table 6.

TABLE 6

| MCS level | -x | ... | 0 | 1 | ... | x |
|---|---|---|---|---|---|---|
| MCS interval | [MCS$_0$, MCS$_1$) | ... | [MCS$_m$, MCS$_{m+1}$) | [MCS$_{m+1}$, MCS$_{m+2}$) | ... | [MCS$_{x-1}$, MCS$_x$) |
| SC level correction amount | -y | ... | 0 | 1 | ... | y |

For example, based on Table 5, when the SC is 80 k and falls within an interval [60 k, 120 k), a corresponding time domain density is ½. With reference to Table 6, when a value of the MCS falls within an interval [MCS$_{m+1}$, MCS$_{m+2}$), a corresponding SC level correction amount is 1, and it indicates that an original SC level 2 is increased to an SC level 3. Based on Table 5, it can be learned that a corrected time domain density is ¼.

Optionally, higher layer signaling may also be used to instruct to adjust a correspondence, in a solution, between an MCS level and an MCS interval corresponding to the MCS level and/or to adjust a correspondence between an SC level and an SC interval corresponding to the SC level, to adapt to a new scenario and condition.

For example, quantities or a quantity of levels by which the MCS level and/or the SC level shown in Table 5 or Table 6 are/is increased or decreased may be directly adjusted by using higher layer signaling.

In the configuration of Embodiment 2, after receiving the one or more OFDM symbols from the transmit device, the receive device may determine a time-frequency location of the PTRS in the one or more OFDM symbols in the following manner:

obtaining a subcarrier spacing (SC) and/or a modulation and coding scheme (MCS) of a current slot;

determining the PTRS time domain density based on preconfigured or prestored information about a correspondence between the subcarrier spacing (SC) and/or the modulation and coding scheme (MCS) and the PTRS time domain density, where the PTRS time domain density is used to indicate that one PTRS is mapped to every several OFDM symbols in time domain; and determining the time-frequency location of the PTRS in the one or more OFDM symbols based on the PTRS time domain density and a preset rule.

Frequency Domain Solution

For mapping of the PTRS in frequency domain, a table of a correspondence between the MCS and/or the BW and a quantity of subcarriers to which the PTRS is mapped in each OFDM symbol in frequency domain may be established according to a specific criterion, or a table of a correspondence between the frequency domain density and the MCS and/or the BW may be established according to a specific criterion. In this embodiment of the present invention, PTRS frequency domain configuration information may be indicated based on the MCS and/or the BW, and no additional indication information is required to notify a receive end.

There are a plurality of mapping rules between a PTRS frequency domain mapping pattern and the MCS and/or the BW. The following uses a plurality of embodiments for description.

Figure 7A:
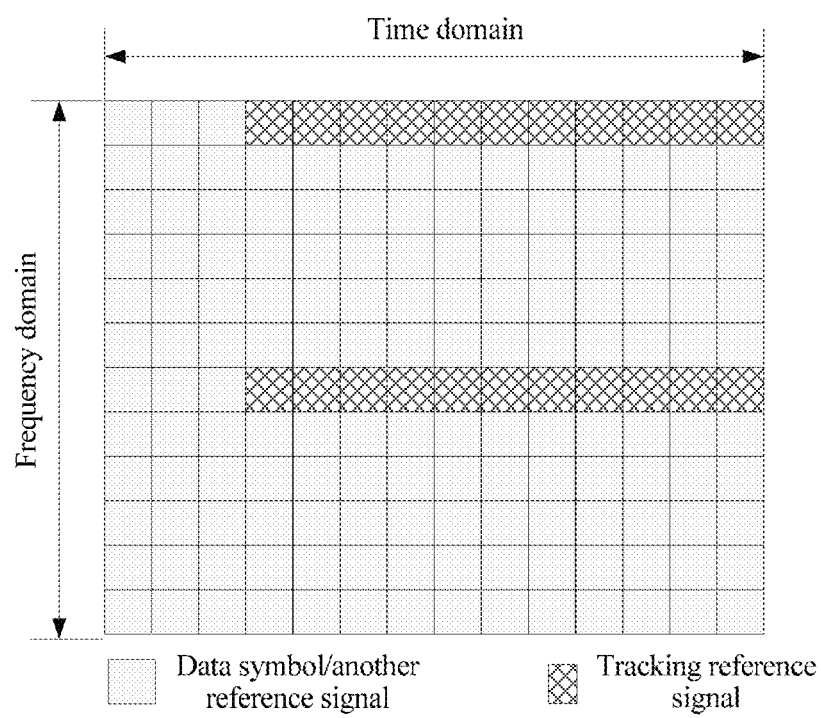
FIG. 7A is a schematic diagram of a PTRS frequency domain mapping according to an embodiment of the present disclosure.
Figure 7B:
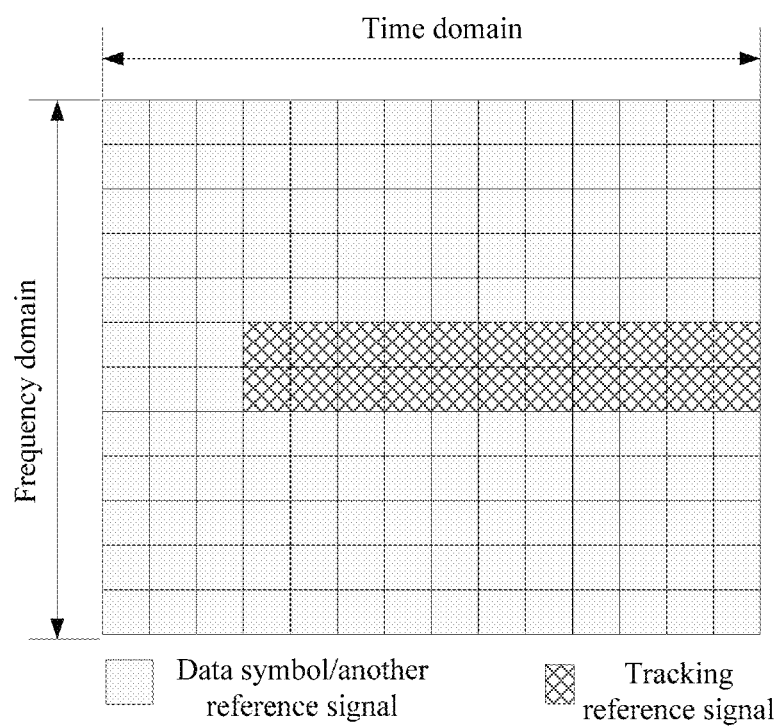
FIG. 7B is a schematic diagram of another PTRS frequency domain mapping according to an embodiment of the present disclosure.
Figure 7C:
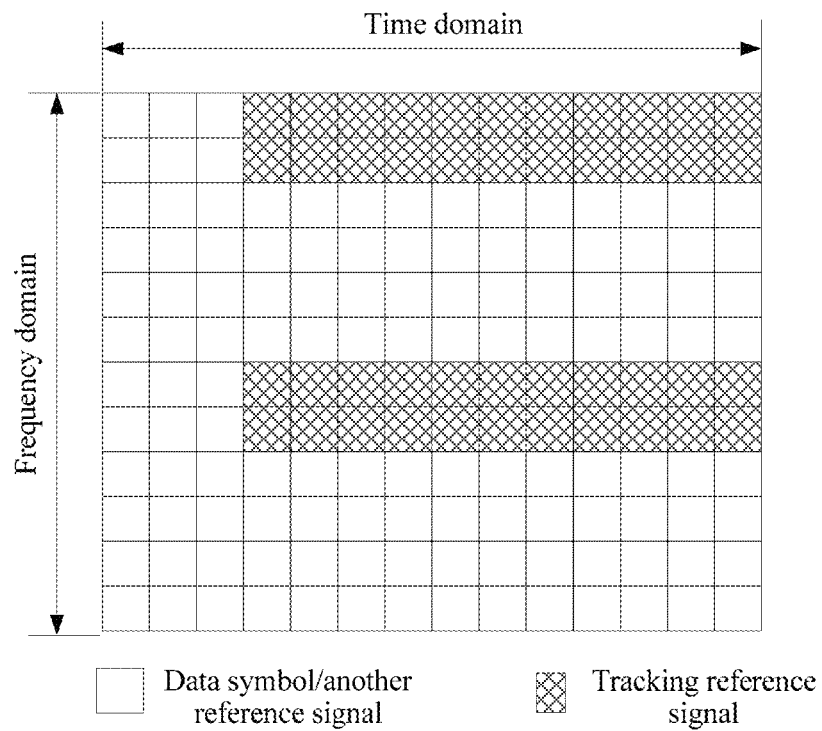
FIG. 7C is a schematic diagram of another PTRS frequency domain mapping according to an embodiment of the present disclosure.

In frequency domain, PTRSs occupy several subcarriers, and the PTRSs are evenly distributed or consecutively distributed on the transmission bandwidth. One resource block is used as an example. It is assumed that the PTRS is mapped to all OFDM symbols (3 to 13) in time domain. FIG. 7A, FIG. 7B, and FIG. 7C provide three specific embodiments in which PTRSs are evenly mapped in frequency domain and are mapped to adjacent subcarriers.

Embodiment 3: Establish a correspondence between the BW and a quantity of PTRS frequency domains.

For example, a correspondence table may be established according to a specific criterion, as shown in Table 7.

TABLE 7

| BW level | 0 | 1 | 2 | ... | K |
|---|---|---|---|---|---|
| BW | $<BW_0$ | $[BW_0, BW_1)$ | $[BW_1, BW_2)$ | ... | $<BW_K$ |
| Quantity of PTRS frequency domains | $P_0$ | $P_1$ | $P_2$ | ... | $P_K$ |

For example, when the bandwidth falls within an interval $[BW_0, BW_1)$, it can be learned from Table 7 that the quantity of PTRS frequency domains is $P_1$. It is assumed that there are a total of 10 subcarriers in frequency domain, and a value of $P_1$ is 3, and it indicates that the PTRS occupies a total of three of the 10 subcarriers in frequency domain. The three subcarriers may be selected according to a preset rule. For example, the preset rule is selecting first three subcarriers, selecting last three subcarriers, selecting three of the subcarriers based on a formula or an algorithm, or mapping PTRSs to three of the 10 subcarriers at equal intervals.

The preset rule may be specified in the standard and preconfigured or prestored on the transmit device and the receive device.

In the configuration of Embodiment 3, after receiving the one or more OFDM symbols from the transmit device, the receive device may determine a time-frequency location of the PTRS in the one or more OFDM symbols in the following manner:

obtaining a bandwidth in a current network; and determining the time-frequency location of the PTRS in the one or more OFDM symbols based on preconfigured or prestored information about a correspondence between the bandwidth and the quantity of PTRS frequency domains.

Embodiment 4: Establish a correspondence between the BW and a PTRS frequency domain density T.

The frequency domain density is used to indicate a PTRS density or the quantity of PTRS frequency domains on each scheduled bandwidth.

For example, a correspondence table is established according to a specific criterion, as shown in Table 8. For example, if the frequency domain density is equal to $1/12$, and the scheduled bandwidth is four RBs (the scheduled bandwidth is a known bandwidth allocated by the base station to the terminal), that is, 48 subcarriers (each RB includes 12 subcarriers), a total of four PTRSs ($48*1/12=4$) are mapped on the scheduled bandwidth of four RBs. The four PTRSs may be mapped on the scheduled bandwidth at equal intervals, or may be mapped to four consecutive subcarriers, or may be mapped to four inconsecutive subcarriers through hashing according to another rule. Details are shown in Table 8.

TABLE 8

| BW level | 0 | 1 | 2 | ... | K |
|---|---|---|---|---|---|
| BW interval | $<BW_0$ | $[BW_0, BW_1)$ | $[BW_1, BW_2)$ | ... | $<BW_K$ |
| Frequency domain density | $T_0$ | $T_1$ | $T_2$ | ... | $T_k$ |

Optionally, higher layer signaling may be used to instruct to adjust a correspondence, in a solution, between a BW level and a BW interval corresponding to the BW level. Specifically, the BW level may be directly increased or decreased by x levels through adjustment by using higher layer signaling, where x is an integer less than or equal to K.

In the configuration of Embodiment 4, after receiving the one or more OFDM symbols from the transmit device, the receive device may determine a time-frequency location of the PTRS in the one or more OFDM symbols in the following manner obtaining a bandwidth in a current network and determining the time-frequency location of the PTRS in the one or more OFDM symbols based on preconfigured or prestored information about a correspondence between the bandwidth and the PTRS frequency domain density.

Embodiment 5: Establish a one-to-one correspondence between both MCSs and BWs and quantities (K) of frequency domain pilots or frequency domain densities.

For example, BWs are classified into K levels (columns in Table 9), and MCSs are classified into M levels (rows in Table 9), to obtain a correspondence table of K*M dimensions, as shown in Table 9.

TABLE 9

| BW/MCS | | BW level | 0 | 1 | 2 | ... | K − 1 |
|---|---|---|---|---|---|---|---|
| MCS level | MCS | BW | $<BW_0$ | $[BW_0, BW_1)$ | $[BW_1, BW_2)$ | ... | $>=BW_{k-1}$ |
| 0 | $<MCS_0$ | | $T_{11}$ | $T_{12}$ | $T_{13}$ | ... | $T_{1K}$ |
| 1 | $[MCS_0, MCS_1)$ | | $T_{21}$ | $T_{22}$ | $T_{23}$ | ... | $T_{2K}$ |
| ... | ... | | ... | ... | ... | ... | ... |
| M − 1 | $>=MCS_{m-1}$ | | $T_{M1}$ | $T_{M2}$ | $T_{M3}$ | ... | $T_{MK}$ |

For example, the scheduled bandwidth (BW) allocated by the base station to the terminal falls within an interval $[BW_1, BW_2)$, and a value of the MCS used by the base station falls within an interval $[MCS_0, MCS_1)$. It can be learned, based on mapping information in Table 9, that the quantity of PTRS frequency domains or the PTRS frequency domain density is $T_{23}$. $T_{23}$ herein may be a decimal or an integer.

If $T_{23}$ indicates the quantity of PTRS frequency domains, an integer obtained after $T_{23}$ is rounded up or rounded down indicates the quantity of PTRS frequency domains.

If $T_{23}$ indicates the PTRS frequency domain density, $T_{23}$ may not be rounded.

Further, when $T_{23}$ indicates the quantity of PTRS frequency domains, the receive device may determine, according to a preset rule or a preset algorithm, a specific subcarrier to which the PTRS is mapped.

For example, the preset rule may be mapping $T_{23}$ PTRSs at equal intervals starting from a first subcarrier, or consecutively mapping $T_{23}$ PTRSs starting from a fifth subcarrier, or mapping one PTRS every other subcarrier starting from a first subcarrier until all PTRSs are mapped.

The preset rule or the preset algorithm may be directly specified in the standard and prestored or preconfigured on the transmit device and the receive device.

Optionally, higher layer signaling may be used to instruct to adjust a correspondence, in a solution, between a BW level and a BW interval corresponding to the BW level, or instruct to adjust a correspondence, in a solution, between an MCS level and an MCS interval corresponding to the MCS level, or instruct to adjust both a correspondence between a BW level and a BW interval corresponding to the BW level and a correspondence between an MCS level and an MCS interval corresponding to the MCS level. The BW level and/or the MCS level may be directly increased or decreased by X or Y levels through configuration by using higher layer signaling. X and Y are integers greater than 0.

In the configuration of Embodiment 5, after receiving the one or more OFDM symbols from the transmit device, the receive device may determine a time-frequency location of the PTRS in the one or more OFDM symbols in the following manner obtain a modulation and coding scheme (MCS) in a current network, obtain a bandwidth in the current network, determine a quantity of PTRS frequency domains or a PTRS frequency domain density based on a preconfigured or prestored correspondence between both the MCS and the bandwidth and the quantity of PTRS frequency domains or the PTRS frequency domain density, and determine the time-frequency location of the PTRS in the one or more OFDM symbols based on the quantity of PTRS frequency domains or the PTRS frequency domain density.

According to the method in the present invention, the receive device may obtain PTRS-related configuration information by using information such as the MCS, the BW, and the SC. This can reduce signaling overheads in comparison with the prior art.

Figure 8:
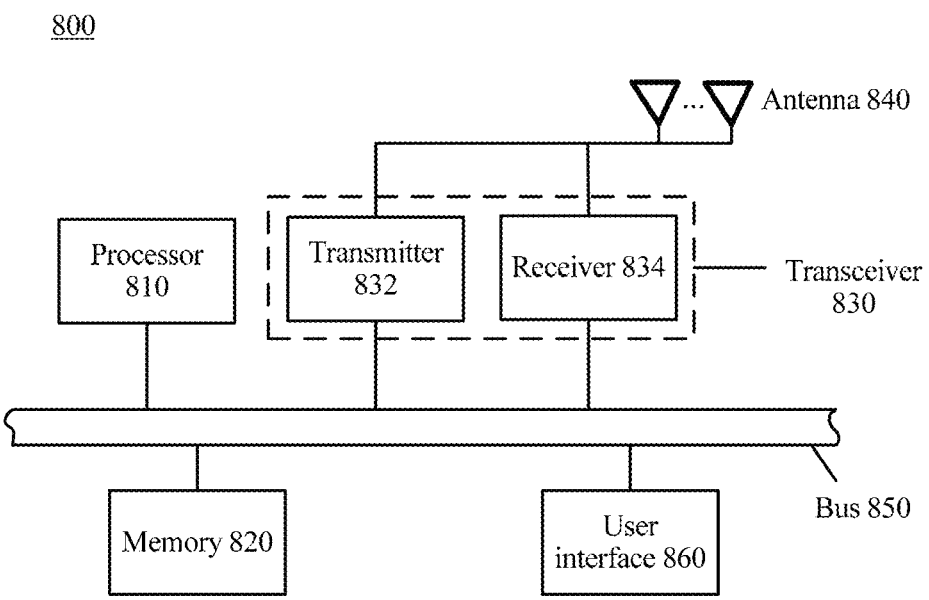
FIG. 8 is a schematic structural diagram of a transmit device according to an embodiment of the present disclosure.

FIG. 8 is a schematic block diagram of a transmit device 800 according to another embodiment of the present invention. The transmit device 800 includes a processor 810, a memory 820, a transceiver 830, an antenna 840, a bus 850, and a user interface 860.

Specifically, the processor 810 controls an operation of the transmit device 800, and the processor may be a general-purpose processor, a digital signal processor, a dedicated integrated circuit, a field programmable gate array, or another programmable logic device.

The transceiver 830 includes a transmitter 832 and a receiver 834, the transmitter 832 is configured to transmit a signal, and the receiver 834 is configured to receive a signal. There may be one or more antennas 840. The transmit device 800 may further include the user interface 860 such as a keyboard, a microphone, a loudspeaker, and/or a touchscreen. The user interface 860 may transfer content and a control operation to the transmit device 800.

All components of the transmit device 800 are coupled together by using the bus 850. In addition to a data bus, the bus 850 includes a power bus, a control bus, and a status signal bus. However, for clarity of description, various buses are marked as the bus 850 in the figure. It should be noted that the foregoing descriptions about the transmit device structure may be applied to the embodiments of the present invention.

The memory 820 may include a read-only memory (ROM), a random access memory (RAM), or another type of dynamic storage device that may store information and an instruction, or may be a magnetic disk storage. The memory 820 may be configured to store an instruction for implementing the related method provided in the embodiments of the present invention. It may be understood that an executable instruction is programmed or loaded into at least one of the processor 810, a cache, and a long term memory of the transmit device 800.

In a specific embodiment, the processor 810 is configured to map a PTRS to one or more OFDM symbols based on information about a correspondence between the PTRS and one or more of a modulation and coding scheme (MCS), a bandwidth (BW), and a subcarrier spacing (SC).

The transceiver 830 is configured to send the one or more OFDM symbols to which the PTRS is mapped to a receive device.

Optionally, the processor 810 is further configured to determine to map the phase tracking reference signal (PTRS) to the one or more orthogonal frequency division multiplexing (OFDM) symbols.

Further, the processor 810 is specifically configured to: when the MCS meets a preset condition, determine to map the PTRS to the one or more OFDM symbols.

Further, the processor 810 is specifically configured to, when the bandwidth meets a preset condition and the MCS meets a preset condition, determine to map the PTRS to the one or more OFDM symbols.

Optionally, the memory 820 is configured to prestore information about a correspondence between the subcarrier spacing and/or the MCS and a PTRS time domain density, where the PTRS time domain density is used to indicate that one PTRS is mapped to every several OFDM symbols. For a specific correspondence, refer to the descriptions in Embodiment 1 and Embodiment 2, and details are not described herein again.

Optionally, the memory 820 is configured to prestore a correspondence between the bandwidth and a quantity of PTRS frequency domains or a PTRS frequency domain density.

Optionally, the memory 820 is configured to prestore a correspondence between the MCS and a quantity of PTRS frequency domains or a PTRS frequency domain density.

Optionally, the memory 820 is configured to prestore a correspondence between both the MCS and the bandwidth and a quantity of PTRS frequency domains or a PTRS frequency domain density.

It should be understood that the transmit device shown in FIG. 8 may be a base station or a terminal.

It should be further understood that the transmit device shown in FIG. 8 corresponds to the transmit device in the foregoing method embodiment, and descriptions about all details of the method embodiment may be used to explain the apparatus embodiment of the transmit device. For details of interaction between the transmit device and the receive device, refer to the foregoing description. Details are not described again.

Figure 9:
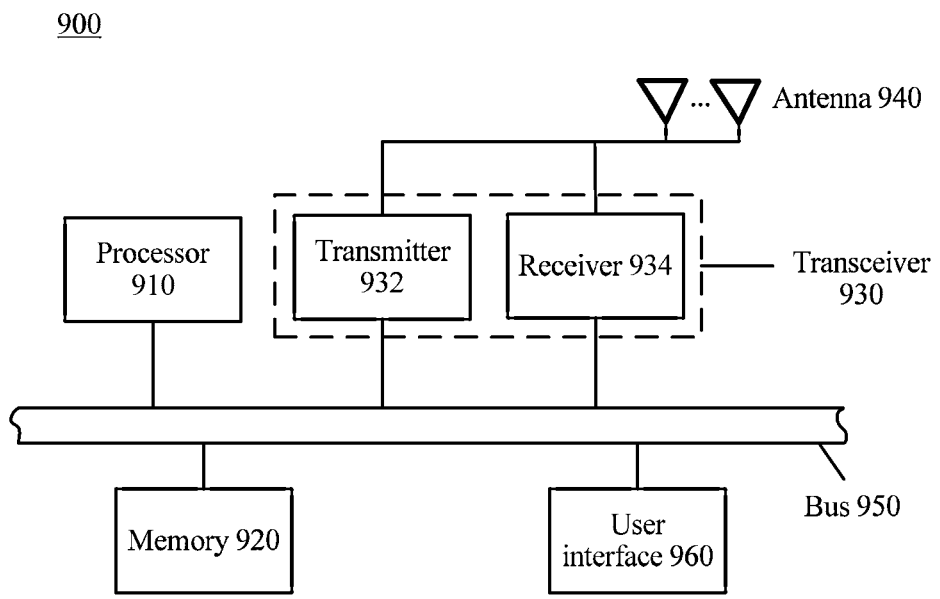
FIG. 9 is a schematic structural diagram of a receive device according to an embodiment of the present disclosure.

FIG. 9 is a schematic block diagram of a receive device 900 according to another embodiment of the present invention. The receive device 900 includes a processor 910, a memory 920, a transceiver 930, an antenna 940, a bus 950, and a user interface 960.

Specifically, the processor 910 controls an operation of the receive device 900, and the processor may be a general-purpose processor, a digital signal processor, a dedicated integrated circuit, a field programmable gate array, or another programmable logic device.

The transceiver 930 includes a transmitter 932 and a receiver 934, the transmitter 932 is configured to transmit a signal, and the receiver 934 is configured to receive a signal. There may be one or more antennas 940. The receive device 900 may further include the user interface 960 such as a keyboard, a microphone, a loudspeaker, and/or a touchscreen. The user interface 960 may transfer content and a control operation to the receive device 900.

All components of the receive device 900 are coupled together by using the bus 950. In addition to a data bus, the bus 950 includes a power bus, a control bus, and a status signal bus. However, for clarity of description, various buses are marked as the bus 950 in the figure. It should be noted that the foregoing descriptions about a network element structure may be applied to the embodiments of the present invention.

The memory 920 may include a read-only memory (ROM), a random access memory (RAM), or another type of dynamic storage device that may store information and an instruction, or may be a magnetic disk storage. The memory 920 may be configured to store an instruction for implementing the related method provided in the embodiments of the present invention. It may be understood that an executable instruction is programmed or loaded into at least one of the processor 910, a cache, and a long term memory of the receive device 900. In a specific embodiment, the memory is configured to store computer executable program code. When the program code includes an instruction, and the processor executes the instruction, the instruction enables the receive device to perform the following operations:

The transceiver 930 is configured to receive one or more orthogonal frequency division multiplexing OFDM symbols from a transmit device.

The processor 910 is configured to determine a phase tracking reference signal (PTRS) from the one or more OFDM symbols based on information about a correspondence between the PTRS and one or more of a modulation and coding scheme (MCS), a bandwidth (BW), and a subcarrier spacing (SC).

Optionally, the processor 910 is specifically configured to obtain a subcarrier spacing (SC) and/or a modulation and coding scheme (MCS) of a current slot determine a PTRS time domain density based on preconfigured or prestored information about a correspondence between the subcarrier spacing and/or the MCS and the PTRS time domain density, where the PTRS time domain density is used to indicate that one PTRS is mapped to every several OFDM symbols in time domain; and determine a time-frequency location of the PTRS in the one or more OFDM symbols based on the PTRS time domain density and a preset rule.

Optionally, the processor 910 is specifically configured to obtain a bandwidth in a current network; and determine the time-frequency location of the PTRS in the one or more OFDM symbols based on preconfigured or prestored information about a correspondence between the bandwidth and a quantity of PTRS frequency domains.

Optionally, the memory 920 is configured to prestore information about a correspondence between the subcarrier spacing or the MCS and a PTRS time domain density, where the PTRS time domain density is used to indicate that one PTRS is mapped to every several OFDM symbols.

Optionally, the processor 910 can be configured to obtain a bandwidth in a current network and determine the time-frequency location of the PTRS in the one or more OFDM symbols based on preconfigured or prestored information about a correspondence between the bandwidth and a PTRS frequency domain density.

Optionally, the processor 910 is configured to obtain a modulation and coding scheme (MCS) in a current network, obtain a bandwidth in the current network, determine a quantity of PTRS frequency domains or a PTRS frequency domain density based on a preconfigured or prestored correspondence between both the modulation and coding scheme (MCS) and the bandwidth and the quantity of PTRS frequency domains or the PTRS frequency domain density; and determine the time-frequency location of the PTRS in the one or more OFDM symbols based on the quantity of PTRS frequency domains or the PTRS frequency domain density.

Optionally, the memory 920 is configured to prestore a correspondence between the bandwidth and a quantity of PTRS frequency domains or a PTRS frequency domain density.

Optionally, the memory 920 is configured to prestore a correspondence between the MCS and a quantity of PTRS frequency domains or a PTRS frequency domain density.

Optionally, the memory 920 is further configured to prestore a correspondence between both the modulation and coding scheme (MCS) and the BW and a quantity of PTRS frequency domains.

Optionally, the memory 920 is further configured to prestore a correspondence between both the MCS and the BW and a PTRS frequency domain density.

For a specific implementation of performing operations by the processor included in the receive device, refer to corresponding steps performed by the receive device in the method embodiment. Details are not described again in this embodiment of the present invention.

It should be understood that the receive device shown in FIG. 9 corresponds to the receive device in the foregoing method embodiment, and descriptions about all details of the method embodiment may be used to explain the apparatus embodiment of the receive device. For details of interaction between the transmit device and the receive device, refer to the foregoing description. Details are not described again.

An embodiment of the present invention further provides a computer storage medium, configured to store a computer software instruction used by a transmit device. The computer software instruction includes a program designed for performing the foregoing embodiment.

An embodiment of the present invention further provides a computer storage medium, configured to store a computer software instruction used by the foregoing receive device. The computer software instruction includes a program designed for performing the foregoing embodiment.

An embodiment of the present invention further provides a communications network system, including a transmit device and a receive device.

The transmit device is configured to perform steps performed by the transmit device in the method embodiment.

The receive device is configured to perform steps performed by the receive device in the method embodiment.

For a process of interaction between the transmit device and the receive device, refer to the descriptions in the method embodiment, and details are not described herein again.

In the embodiments of the present invention, the subcarrier spacing or the modulation and coding scheme or the bandwidth is used to implicitly indicate the time-frequency location of the PTRS, so that no explicit DCI indication is required. In comparison with the prior art, signaling overheads are reduced.

In the specification, claims, and accompanying drawings of the present invention, the terms "first", "second", "third", "fourth", and the like are intended to distinguish between different objects but do not indicate a particular order. Moreover, the terms "include", "contain", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What are disclosed above are merely examples of the embodiments of the present invention, and certainly are not intended to limit the scope of the claims of the present invention. Therefore, equivalent variations made in accordance with the claims of the present invention shall fall within the scope of the present invention.

What is claimed is:

1. A reference signal transmission method performed by a transmit device, comprising:
   determining a time domain density of a phase tracking reference signal (PTRS) based on a modulation and coding scheme (MCS) and a correspondence between MCS and PTRS time domain density;
   determining a frequency domain density of the PTRS based on a scheduled bandwidth and a correspondence between scheduled bandwidth and PTRS frequency domain density;
   mapping the PTRS to one or more orthogonal frequency division multiplexing (OFDM) symbols according to the time domain density of the PTRS and the frequency domain density of the PTRS; and
   sending the PTRS which is mapped to the one or more OFDM symbols to a receive device;
   wherein the correspondence between MCS and PTRS time domain density comprises:
   different MCS intervals one-to-one corresponding to different PTRS time domain densities;
   wherein the correspondence between scheduled bandwidth and PTRS frequency domain density comprises:
   different scheduled bandwidth intervals one-to-one corresponding to different PTRS frequency domain densities.

2. The method according to claim 1, further comprising:
   when the MCS is less than a first threshold, not mapping the PTRS; or
   when the scheduled bandwidth is less than a second threshold, not mapping the PTRS.

3. The method according to claim 2, further comprising:
   receiving the first or the second threshold through a higher layer signaling.

4. The method according to claim 1, wherein:
   the correspondence between MCS and PTRS time domain density and the correspondence between scheduled bandwidth and PTRS frequency domain density are preconfigured or prestored.

5. A communications apparatus, comprising:
   a processor, configured to determine a time domain density of a phase tracking reference signal (PTRS) based on a modulation and coding scheme (MCS) and a correspondence between MCS and PTRS time domain density;
   determine a frequency domain density of the PTRS based on a scheduled bandwidth and a correspondence between scheduled bandwidth and PTRS frequency domain density; and
   map the PTRS to one or more orthogonal frequency division multiplexing (OFDM) symbols according to the time domain density of the PTRS and the frequency domain density of the PTRS; and
   a transceiver, configured to send the PTRS which is mapped to the one or more OFDM symbols to a receive device;
   wherein the correspondence between MCS and PTRS time domain density comprises:
   different MCS intervals one-to-one corresponding to different PTRS time domain densities;
   wherein the correspondence between scheduled bandwidth and PTRS frequency domain density comprises:
   different scheduled bandwidth intervals one-to-one corresponding to different PTRS frequency domain densities.

6. The communications apparatus according to claim 5, further comprising:
   when the MCS is less than a first threshold, not mapping the PTRS; or
   when the scheduled bandwidth is less than a second threshold, not mapping the PTRS.

7. The communications apparatus according to claim 6, wherein:
   the transceiver is further configured to receive the first or the second threshold through a higher layer signaling.

8. The communications apparatus according to claim 5, further comprising:
   a memory, configured to store the correspondence between MCS and PTRS time domain density and the correspondence between scheduled bandwidth and PTRS frequency domain density.

9. The communications apparatus according to claim 5, wherein:
   the processor is further configured to preconfigure the correspondence between MCS and PTRS time domain density and the correspondence between scheduled bandwidth and PTRS frequency domain density.

10. The communications apparatus according to claim 5, wherein:
    the correspondence between MCS and PTRS time domain density and the correspondence between scheduled bandwidth and PTRS frequency domain density are preconfigured or prestored.

* * * * *

UNITED STATES PATENT AND TRADEMARK OFFICE
CERTIFICATE OF CORRECTION

| | |
|---|---|
| PATENT NO. | : 11,764,928 B2 |
| APPLICATION NO. | : 17/825879 |
| DATED | : September 19, 2023 |
| INVENTOR(S) | : Zhang et al. |

Page 1 of 1

It is certified that error appears in the above-identified patent and that said Letters Patent is hereby corrected as shown below:

In the Claims

Claim 1: Column 21, Line 58, cancel the text beginning with "1. A reference signal transmission method performed by" to and ending "sities." in Column 22, Line 16, and insert the following claim:
-- 1. A reference signal transmission method performed by a transmit device, comprising: determining a time domain density of a phase tracking reference signal (PTRS) based on a modulation and coding scheme (MCS) and a correspondence between MCS and PTRS time domain density; determining a frequency domain density of the PTRS based on a scheduled bandwidth and a correspondence between scheduled bandwidth and PTRS frequency domain density; mapping the PTRS to one or more orthogonal frequency division multiplexing (OFDM) symbols according to the time domain density of the PTRS and the frequency domain density of the PTRS; and after the mapping the PTRS to the one or more OFDM symbols, sending the PTRS to a receive device; wherein the correspondence between MCS and PTRS time domain density comprises: different MCS intervals in one-to-one correspondence with different PTRS time domain densities; and wherein the correspondence between scheduled bandwidth and PTRS frequency domain density comprises: different scheduled bandwidth intervals in one-to-one correspondence with different PTRS frequency domain densities. --

Claim 3: Column 22, Line 23: "receiving the first or the second threshold through a higher" should read -- receiving the first threshold or the second threshold through higher --.

Signed and Sealed this
Second Day of January, 2024

Katherine Kelly Vidal
*Director of the United States Patent and Trademark Office*